United States Patent [19]
Kim et al.

[11] Patent Number: 4,995,955
[45] Date of Patent: Feb. 26, 1991

[54] OPTICALLY-ASSISTED GAS DECONTAMINATION PROCESS

[75] Inventors: Yong W. Kim, Bethlehem; William A. Frederick, Allentown, both of Pa.

[73] Assignee: Lehigh University, Bethlehem, Pa.

[21] Appl. No.: 517,408

[22] Filed: Apr. 26, 1990

Related U.S. Application Data

[63] Continuation of Ser. No. 407,689, Sep. 14, 1989, abandoned, which is a continuation of Ser. No. 107,867, Oct. 8, 1987, abandoned, which is a continuation of Ser. No. 775,449, Sep. 12, 1985, abandoned.

[51] Int. Cl.$^5$ ............... B01D 53/32; C01B 17/00; C01B 21/00
[52] U.S. Cl. .................. 204/157.3; 204/157.41; 204/157.46; 204/157.49; 204/157.2; 423/235; 423/342
[58] Field of Search ........... 204/157.3, 157.41, 157.46, 204/157.49, 157.2; 423/235, 342

[56] References Cited
U.S. PATENT DOCUMENTS

| | | | |
|---|---|---|---|
| 3,560,363 | 2/1971 | Goetz | 204/157.3 |
| 3,869,362 | 3/1975 | Machi et al. | 204/157.3 |
| 3,984,296 | 10/1976 | Richards | 204/157.3 |
| 4,004,995 | 1/1977 | Machi et al. | 204/157.1 P |
| 4,416,748 | 11/1983 | Stevens | 204/157.3 |

FOREIGN PATENT DOCUMENTS

| | | | |
|---|---|---|---|
| 2756186 | 6/1978 | Fed. Rep. of Germany | 204/157.3 |
| 107959 | 10/1974 | Japan | 204/157.1 P |

*Primary Examiner*—John F. Niebling
*Assistant Examiner*—David G. Ryser
*Attorney, Agent, or Firm*—Ratner & Prestia

[57] ABSTRACT

The present invention comprises a process for the removal of oxides of nitrogen and sulfur from a gas mixture containing those species by exposure of the gas mixture to ultraviolet radiation having a wavelength below 200 nanometers in absence of ammonia.

11 Claims, 2 Drawing Sheets

OPTICALLY-ASSISTED GAS DECONTAMINATION PROCESS

This application is a continuation of Ser. No. 407,689, filed 9/14/89, now abandoned, which is a continuation of Ser. No. 107,867, filed 10/8/87, now abandoned, which is a continuation of Ser. No. 775,449, filed 9/12/85, now abandoned.

BACKGROUND OF THE INVENTION

The present invention involves irradiation of gas mixtures such as combustion gases and particularly flue gases, to facilitate removal of certain contaminants. More specifically, a gas stream is optically "pumped" to enhance reactivity and to convert sulfur and nitrogen oxide contaminants to oxidized and more readily nucleated species for recovery of those contaminants in an electrostatic precipitator.

It is generally known that certain chemical and physical processes in systems of interacting molecular species can be induced to occur at accelerated or decelerated rates by selective excitation of certain species. Such excitation by electromagnetic radiation in or near the visible spectrum is sometimes referred to as optical pumping. Optical pumping may increase the population of the particular molecular states where the interaction matrix elements have intrinsically large values, or molecular states where the interaction threshold energy requirements can be met at a given temperature of the reaction system. A well known example of the first case is the formation of photochemical smog and of the latter is optically pumped lasers.

The present invention is concerned with optical excitation of gas mixtures containing sulfur and nitrogen oxides in order to promote oxidation and nucleation of those materials. More highly oxidized forms of sulfur and nitrogen oxides may then be scrubbed from effluent gas streams by conventional techniques, such as electrostatic precipitation.

Typical of the prior art regarding photochemical reactions of sulfur dioxide and oxides of nitrogen is U.S. Pat. No. 4,097,349 to Zenty. As taught therein, gas streams containing hydrocarbons, oxygen, sulfur dioxide and oxides of nitrogen ($NO_x$) can be subjected to ultraviolet light in order to promote a variety of reactions. As disclosed by Zenty, light having a wavelength of from 240 nanometers to 340 nanometers is typical of that absorbed by sulfur dioxide (column 3, lines 12-15). Equation 17 of the Zenty patent demonstrates the absorption of 290-340 nanometer ultraviolet radiation by sulfur dioxide to produce a singlet $SO_2$. Equation 18 of the Zenty patent demonstrates the absorption of 340-400 nanometer ultraviolet radiation by $SO_2$ to produce triplet $SO_2$. Zenty further discusses the transformation of singlet $SO_2$ to triplet $SO_2$ which is then reacted with another species present in the gas stream to quench the triplet (excited state) sulfur dioxide. In all cases, the production of excited state sulfur oxides precedes the quenching of the excited state species by materials including nitrogen, oxygen, water, carbon monoxide, carbon dioxide, nitric oxide, ozone, methane, and other hydrocarbon species. It must be noted, however, that Zenty does not suggest or teach a reaction of ground state (unexcited) oxides of sulfur in order to remove such species from a gas stream. Although the Abstract and claim 1 of this patent indicate irradiation with a wavelength of 150 to 750 nanometers, the specification does not indicate what effects, if any, are produced with radiation having a wavelength below 240 nanometers.

An alternative process for the reduction of sulfur and nitrogen oxide contaminants in effluent gas streams is taught by Richards in U.S. Pat. No. 3,984,296. This reference teaches the formation of electron donor-acceptor molecular complexes (EDA complexes) in flue gas by the exposure of the flue gas to Lewis acids or bases formed electrostatically within a corona precipitator. Alternatively, Richards suggests a photochemical technique for the production of the EDA complexes using infrared radiation of 400 to 1,000 nanometer wavelengths or ultraviolet radiation of 120 to 240 nanometer wavelengths.

The Richards patent further teaches a photoinduced oxidation of the EDA and reaction of sulfur dioxide (or $NO_x$) with EDA contained in stack gas. For this part of the process, the patent teaches the use of ultraviolet light having a wavelength of 150 to 500 nanometers and optimally between 300 and 400 nanometers in order to carry out the photo-oxidation of the EDA complex. Further, Richards suggests that free radical reactions may occur under the influence of ultraviolet radiation (column 8, lines 12-15). Apart from these broad and non-specific teachings, an understanding of the reactions disclosed by Richards in the Table at column 9, lines 1-21, of the patent reveals that the underlying reaction mechanisms required for practicing the Richards patent are identical to those disclosed by Zenty as reactions 17, 18 and 19 of U.S. Pat. No. 4,097,349. This is particularly apparent because of the preferred wavelength taught by Richards (300 to 400 nanometers) and the lack of any suggestion or teaching by Richards of the formation of ground state atomic oxygen.

Finally, Machi et al (U.S. Pat. No. 3,869,362) disclose a process for removing sulfur and nitrogen oxides from effluent gas streams. As claimed, the Machi process includes irradiation of effluent gases with "ionizing radiation or ultraviolet light."

Although generally mentioned at several places in the patent (col. 1, line 5; col. 5, line 47; abstract), no examples of any radiation source except a Cockcroft-Walton type election beam generator are given. In addition, no specific parameters relating to either an ultraviolet-driven reaction or to ultraviolet light are presented.

The extremely general nature of the teaching of the '362 patent, taken together with the later Machi et al U.S. Pat. No. (4,004,995) (which did not continue the earlier patent's suggestion of the interchangeability of election beams and ultraviolet light) suggest that any reactions noted by Machi et al using ultraviolet light were of the type demonstrated by Zenty. This is made clear by the concentration-dependency of the Machi removal method which is not a characteristic phenomenon of the mechanism of the present invention.

BRIEF DESCRIPTION OF THE INVENTION

Figure 1:
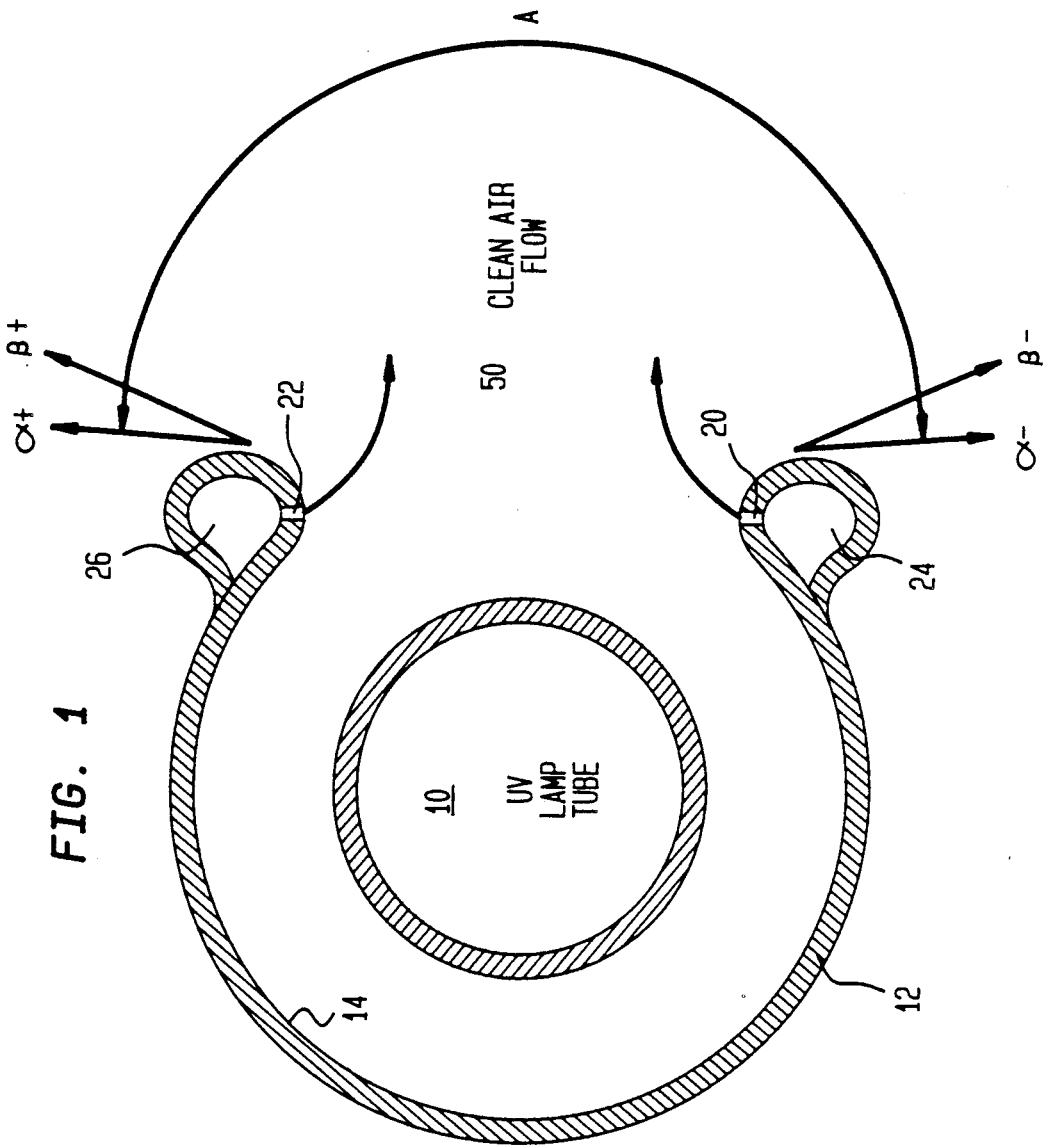
FIG. 1 is a cross-sectional view of a lamp assembly useful in practicing the method of the present invention.

The present invention comprises a method for the reduction of sulfur and nitrogen oxides in a gas mixture through the ultraviolet radiation-induced photochemical formation of ground state (zero charge atomic) oxygen and subsequent attack of such ground state oxygen upon sulfur and nitrogen oxides to produce more highly oxidized compounds. Such compounds tend to nucleate as droplets and to otherwise facilitate their collection in electrostatic precipitators and/or mechanical filters having small pores (on the order of 0.2-0.3 μm.)

In the preferred embodiment, a source of ultraviolet light having a wavelength of below 220 nanometers is installed within a dust-occluding air pressure window device and located directly within a flue gas stream so as to irradiate the stream After irradiation, the gas stream may be conventionally scrubbed by electrostatic precipitation in order to remove, among other things, more highly oxidized sulfur and nitrogen compounds Alternatively, the increased nucleation tendency of the more highly oxidized sulfur and nitrogen species may be used to promote the formation of particles containing undesirable sulfur and nitrogen compounds which may then be more readily collected for disposal.

DETAILED DESCRIPTION OF THE INVENTION

Exposure of a gas mixture including $SO_2$, $H_2O$, and $O_2$ to radiation having a wavelength of up to approximately 220 nanometers is thought to encourage the oxidation of ground state sulfur dioxide according to the following reaction mechanism:

$$O_2 + h\nu \rightarrow 2O_1° \tag{I}$$

$$SO_2 + O_1° \rightarrow SO_3 \tag{II}$$

Similarly, oxidations of various nitrogen oxides are also promoted. After formation of the oxidized species, the water present in the gas mixture reacts with the oxidized species to create mineral acids such as sulfuric and nitric acids. These acids, in turn, hydrate to form a droplet containing an excess of water. These droplets may then be removed from the gas stream by either particle filters or electrostatic precipitators. In addition, the formation of $SO_3$ (a known enhancer of precipitator performance) may provide significantly better precipitation of all particulates in the gas stream.

The individual steps in the reaction chain have been identified through a series of experiments which have demonstrated that the crucial mechanism is the formation of ground state atomic oxygen which then oxidizes the sulfur and nitrogen species present in the flue gas stream. By examining the rate of droplet formation in a typical stream, a sharp transition is noted at wavelengths of approximately 220 nanometers. Contrary to the prior practice in the art, which relied on the formation of excited state or ionized sulfur or nitrogen oxides, oxides in the present system remain in their ground states and are oxidized by atomic oxygen.

Because of the requirements that a UV light source, useful in the present invention, have high output in the shortest wavelength regions, be relatively inexpensive and have a long life, various ultraviolet sources have been investigated. It appears that commercial grade ultraviolet lamps having envelopes fabricated of fused silica and using mercury vapor hold the most promise as commercial light sources. These lamps have sufficient output at wavelengths below 220 nanometers (particularly - an emission line at 184.9 nm which is characteristic of mercury).

A limiting characteristic of currently available ultraviolet sources is the emission spectrum of the discharge material. Mercury, for example, displays several bright lines in the blue region of the visible part of the spectrum. A secondary line of mercury occurs at 184.9 nm in the ultraviolet region.

Another limitation is the ultraviolet transmission characteristics of lamp envelope materials. Because conventional glass envelopes absorb strongly in the ultraviolet region, other materials are required. A preferred material for use in connection with the present invention is fused silica, which transmits the 184.9 nm wavelength to the necessary degree. Other more exotic envelope materials may be found to be superior, but are, at present, more expensive than fused silica, or are subject to environmental degradation in the hot, humid flue gas stream.

A second consideration in the installation of such lamps within commercial effluent gas streams is the collection of dust and other debris in and around the lamp assembly. As a preferred solution to the problem of dust contamination, a novel lamp sheath has been developed. A lamp assembly including this sheath provides both a wide angular field of illumination and a relatively dust-free environment by creating an aerodynamic window on its downstream side. This assembly is shown in FIG. 1.

Referring now to FIG. 1, there is shown a cross-sectional view of the lamp sheath assembly of the present invention. The entire sheath 12 is formed of sheet stainless steel, extruded oxidized aluminum channel, or a similar material and is preferably polished on its interior surface 14. The edges of the sheath are formed into a pair of channels 24,26 which are supplied with a continuous high-pressure flow of dust-free air from a pump (not shown) which exits channels 24,26 at perforations 20,22 spaced linearly along the length of channels 24,26 and sheath 12 (i.e. in the direction perpendicular to the cross-sectional plane of FIG. 1). Mounted concentrically within the sheath are one or more tubular ultraviolet lamps 10. The flow of high-pressure, dust-free air through the channels 24,26 to the perforations 20,22 creates an aerodynamic window 50 and effectively reduces the amount of particulate contamination which impinges upon the ultraviolet source, thus extending the effective working lifetime of the entire lamp assembly.

The interior surface 14 of the sheath 12 is polished in order to increase the effective radiative output of the lamp assembly system. Ultraviolet radiation exits aerodynamic window 50 in the region defined by arc A, which includes both direct radiation $\beta+$ to$\beta-$) and reflected radiation ($\alpha+$ to$\alpha-$).

Certain intensities of radiation are required to produce ground state atomic oxygen as described below in the Examples. Assuming that sufficient amounts of water vapor and oxygen are present in the gas flow, the theoretical net radiative power requirement for substantial removal of sulfur dioxide molecules by the process of the present invention is calculated to be 0.12 watts per cm³/sec of gas flow at standard temperature and pressure per 1% $SO_2$ concentration in the stream by volume.

The present invention promises to provide removal of sulfur dioxide from power plant effluent gas streams at costs which are significantly below those required for conventional lime processes. In particular, a limestone process with forced oxidation may require as much as 30.2% of the output power of a power generating plant to underwrite sulfur dioxide removal costs. Conventional lime spray desulfurizing may require as much as 14.3% of power plant output energy. At assumed efficiencies as low as 10% for the ultraviolet sources employed in the process of the present invention, 15.1% of power plant output may be sufficient to provide $SO_2$ removal. At higher lamp efficiencies, costs required for $SO_2$ removal should decrease dramatically. At an assumed 15% lamp efficiency, only 10.1% of power plant output may be required while, at an assumed 30% lamp efficiency, only 5% may be required. It must be noted that these figures include projected capital and maintenance costs for all systems. In addition, the process of the present invention may remove more than 90% of the sulfur dioxide content of a power plant effluent gas stream, while conventional techniques generally remove less than 90% of the total sulfur dioxide present.

EXAMPLE 1

Identification of photodissociation of molecular oxygen as the key step in the present invention An atmospheric pressure mixture of 1.2% $H_2O$, 0.6% $SO_2$ and 98.2% synthetic air was initially exposed at room temperature to a spectral source of broad wavelength range. A prompt appearance of fine droplets whose size and concentration were found to depend on the intensity and exposure time of the broad spectral source was observed. In order to identify the mechanism of the observed phenomenon, the gas mixture was illuminated by a monochromatic spectral source as a function of wavelength It was found that the rapid droplet formation takes place when the wavelength of the incident light is shorter than, or equal to, 220 nm. (This critical wavelength coincides exactly with the photodissociation threshold energy of molecular oxygen initially in the ground electronic state.)

The rate of droplet formation was further found to increase sharply with decreasing wavelength below the critical wavelength until the transmission cut-off wavelength of fused quartz. This behavior indicates a wavelength (or energy) dependence of the photodissociation cross section of molecular oxygen.

In order to establish unambiguously the role of the photodissociation of molecular oxygen, a separate experiment was carried out in which the photodissociation cross section for molecular oxygen was measured through analysis of the optical absorption coefficient of pure oxygen in a flow. The result is that the cross section increases steeply as a function of wavelength: $2.4 \times 10^{-23} cm^2$ at 200 nm, $1.9 \times 10^{22} cm^2$ at 188 nm and $2.0 \times 10^{-21} cm^2$ and 184.6 nm. A comparison has revealed that the observed rate of droplet formation in the $H_2O$-$SO_2$-synthetic air mixture scales in its wavelength dependence in exactly the same manner as the photodissociation cross section depends on the wavelength of the incident light.

This connection demonstrates that the critical step in the present invention is the copious production of atomic oxygen which facilitates conversion of $SO_2$ to $SO_3$ and then on to formation of droplets with sulfuric acid complex as the nucleation center. The present invention is therefore different from prior processes involving radiative excitation. It does not rely upon photoexcitation of $SO_2$ or $NO_x$, nor does it depend on relative concentration of such species in the gas mixture. Production of atomic oxygen is the primary, rate determining step. The present invention does not require any other intermediary steps or agents and, consequently, is simple and energy efficient. Furthermore, atomic oxygen produced according to the present invention may prove useful in other reactions involving oxidation of compounds other than sulfur and nitrogen.

EXAMPLE 2

Removal of $SO_2$ from gas streams

Removal of $SO_2$ from a gas stream can be achieved by means of particulate removal methods, such as electrostatic precipitation and filtering, once the $SO_2$ molecules are tied up in small particles. The present invention provides a particularly effective method of converting $SO_2$ molecules into sulfuric acid droplets as shown in Example 1. This has been demonstrated both in a laboratory experiment and in an experiment using the flue gas stream of a coal burning power plant. Both experiments involved a gas flow train, consisting of a section for exposure to an ultra-violet light source of a selected wavelength, a section for removal of resulting droplets and a section for measurement of $SO_2$ concentration as well as particle concentration. The two experiments differed in that (1) the composition of the gas mixtures were controlled in the laboratory experiment, whereas the power plant experiment used flue gas as produced by the boiler as given both in its composition and temperature, and (2) the laboratory experiment used monochromatic light of 184.9 nm wavelength while the power plant experiment used a mercury lamp having a fused silica envelope (which emits a bright line at 184.9 nm).

Laboratory Experiment

A gas mixture of 1.2% $H_2O$, 0.6% $SO_2$, and 98.2% synthetic air was exposed to a spectral source of 184.9 nm wavelength for various times. Droplets were filtered from the flowing gas using either a 0.2 um pore filter or a cylindrical, positive-corona, electrostatic precipitator. Final $SO_2$ concentration of the gas stream is measured by absorption spectroscopy using 313 nm monochromatic light transmitted through the absorption cell and detected with a photomultiplier fitted with a 313 nm interference filter.

Figure 2:
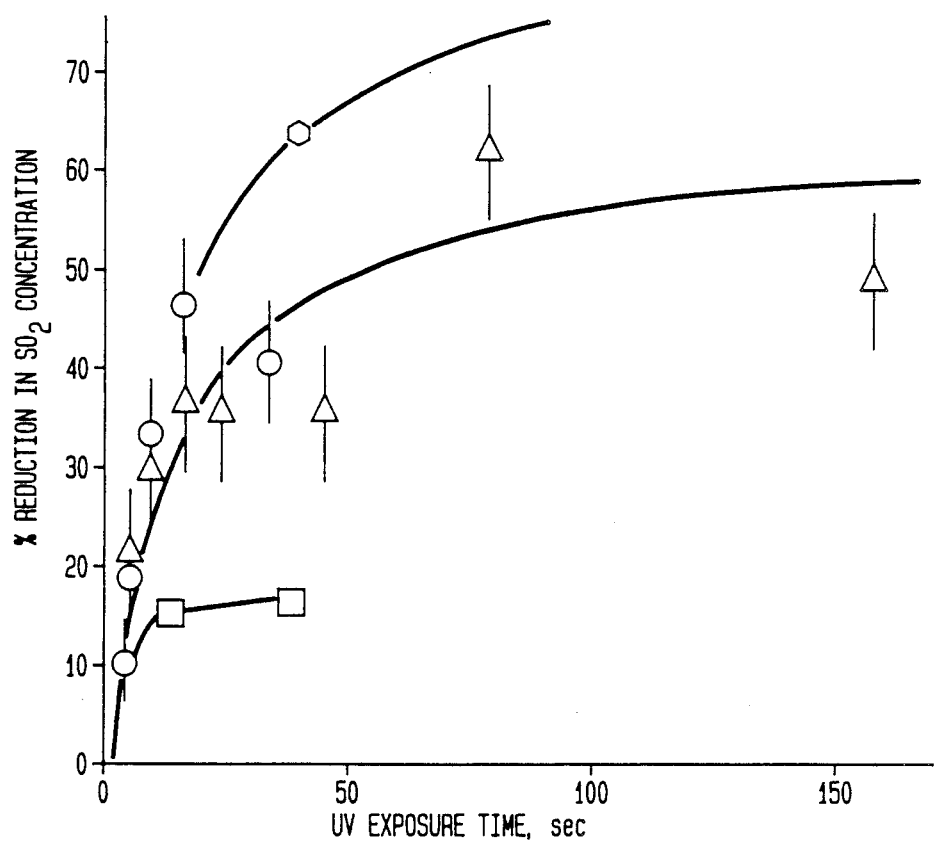
FIG. 2 is a plot of $SO_2$ removal against UV exposure time for both laboratory and power plant experiments.

Circles and triangles plotted in FIG. 2 show percent removal of $SO_2$ as a function of exposure time to the ultraviolet radiation (corresponding to a measurement of power per unit gas volume per unit time (watt/$cm^3$/sec)). Removal of $SO_2$ asymptotically approached 60% with increasing exposure time. The 60% limit is due to exhaustion of the water in the gas stream and concentration of water cannot be increased further due to the low saturated vapor pressure of water at room temperature here.

Because all of the crucial steps in $SO_2$ removal have rate dependencies ($O_1°$ formation, $SO_2$ oxidation, droplet formation), there is no inherent reason why substantially complete $SO_2$ removal cannot be obtained in a properly designed flow train. Sufficient UV exposure and water appear to be essential, however.

Power Plant Experiment

A side stream of the flue gas of the Martins Creek (PA) generating station was processed according to the present invention. Flue gas was sampled just upstream of the electrostatic precipitator currently used by the plant. Flow through the treatment train was maintained by a vacuum pump because the pressure in the main flue is slightly below atmospheric.

The gross composition of the treated gas included approximately 0.12% $SO_2$, 8-13% $H_2O$, and 4-7% $O_2$ (all molar concentrations). Flue gas entering the treatment apparatus was at approximately 230° F. The entire flow train was therefore heated to 230° F. to simulate in-flue treatment.

The spectral source used had about four times the intensity of the laboratory source for the 184.9 nm line of mercury. Droplets were removed by both a 0.3 $\mu$m pore filter and a positive-corona precipitator. FIG. 2 also shows the data from the Martins Creek experiment. When the flue gas was processed through only the 0.3 $\mu$m pore filter, following the exposure to the UV source, the percent $SO_2$ removal figures were found to depend on exposure time (as indicated by the plotted squares) and exhibited asymptotic behavior similar to the laboratory experiment. However, when the electrostatic precipitator was turned on in addition to the filter, $SO_2$ removal effectiveness sharply increased from 16.1% to 63.1% (plotted hexagon) at the same exposure time of 38 seconds. This observation clearly underscores the fact that at high temperatures the droplet size is smaller due to re-evaporation and the precipitator helps capture smaller particles which would otherwise escape the filter. Consequently, more complete removal of $SO_2$ is realized.

These experiments have shown that $SO_2$ can be efficiently removed from these gas streams by the process of the present invention both in a laboratory and power plant environment Given sufficient exposure to ultraviolet radiation of a selected wavelength, substantially complete removal of $SO_2$ can be realized as long as the gas stream contains adequate amounts of oxygen and water. The invention may be practiced with an electrostatic precipitator or particle filters of 0.2 to 0.3 $\mu$m pores or a combination of filters and precipitators as the final repository of acid droplets. It has been demonstrated that the present invention can be implemented in a typical coal burning power plant for removal of $SO_2$ without using any material additives into the flue gas or changing the temperature of the flue gas. It has also been observed that the basic physical steps of the present invention process for $SO_2$ removal operate in full force quite independently of the presence or absence of other gaseous species in the gas stream.

Although the present invention has been disclosed with respect to particular embodiments thereof, it is not limited thereto and the appended claims are intended to be construed to encompass such other variants and modifications of the invention as may be made by those skilled in the art without departing from the true spirit and scope of this invention.

We claim:

1. A process for the removal of sulfur and nitrogen oxides from gas mixtures containing those compounds, together with oxygen and water, comprising the steps of:
    exposing said gas mixture to an ultraviolet light source having a wavelength of below 200 nanometers with sufficient intensity to dissociate molecular oxygen into ground state atomic oxygen;
    permitting said ground state atomic oxygen to oxidize said sulfur and nitrogen oxides;
    permitting said oxidized sulfur and nitrogen oxides to react with water and thereby forming hydrated reaction products;
    removing said hydrated reaction products directly from said gas mixture;
    all of said steps being conducted in the absence of ammonia.

2. The process of claim 1 wherein said sulfur oxide is sulfur dioxide.

3. The process of claim 2 wherein said hydrated reaction products comprise primarily particles of hydrated $SO_3$.

4. The process of claim 3 wherein said hydrated $SO_3$ particles are removed by an electrostatic precipitator.

5. The process of claim 1 wherein said nitrogen oxide is nitric oxide (NO).

6. The process of claim 1 wherein said nitrogen oxide is nitrogen dioxide.

7. The process of claim 1 wherein said, ultraviolet light source has a wavelength of from 200 nanometers to the lowest wavelength transmitted by fused silica.

8. The process of claim 1 wherein said ultraviolet light source is a mercury vapor lamp having an envelope of fused silica, said ultraviolet light source having an emission line at a wavelength of 184.9 nanometers.

9. The process of claim 1 wherein said hydrated reaction products are removed by a filter having 0.3 $\mu$m pores.

10. The process of claim 1 wherein said hydrated reaction products are removed by an electrostatic precipitator.

11. The process of claim 1 wherein said ultraviolet light source emits a substantial portion of its output energy at a wavelength of 184.9 nanometers.

* * * * *